(12) United States Patent
Jayaraman et al.

(10) Patent No.: US 7,012,952 B2
(45) Date of Patent: Mar. 14, 2006

(54) METHOD AND APPARATUS FOR ADJUSTING DELAY IN SYSTEMS WITH TIME-BURST PILOT AND FRACTIONALLY SPACED EQUALIZERS

(75) Inventors: Srikant Jayaraman, San Diego, CA (US); Ivan Jesus Fernandez Corbaton, San Diego, CA (US); John E. Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 815 days.

(21) Appl. No.: 09/921,513

(22) Filed: Aug. 1, 2001

(65) Prior Publication Data

US 2003/0026326 A1 Feb. 6, 2003

(51) Int. Cl.
*H04B 1/707* (2006.01)

(52) U.S. Cl. ............ 375/148; 375/144; 375/147; 375/229; 375/234

(58) Field of Classification Search ............... 375/148, 375/349, 233, 234, 229, 350, 340, 144, 147, 375/346; 370/347, 286
See application file for complete search history.

(56) References Cited

U.S. PATENT DOCUMENTS

| | | | |
|---|---|---|---|
| 4,901,307 A | 2/1990 | Gilhousen et al. | 370/320 |
| 5,103,459 A | 4/1992 | Gilhousen et al. | 370/206 |
| 5,177,740 A | 1/1993 | Toy et al. | 370/337 |
| 5,285,480 A | 2/1994 | Chennakeshu et al. | 375/480 |
| 5,550,810 A * | 8/1996 | Monogioudis et al. | 370/342 |
| 5,838,744 A * | 11/1998 | Zheng | 375/355 |
| 6,175,588 B1 | 1/2001 | Visotsky et al. | 375/148 |
| 6,345,078 B1 * | 2/2002 | Basso | 375/349 |
| 2002/0159507 A1 * | 10/2002 | Flaig et al. | 375/148 |

FOREIGN PATENT DOCUMENTS

| | | |
|---|---|---|
| EP | 1033823 A1 | 9/2000 |
| WO | 0118985 A1 | 3/2001 |

* cited by examiner

*Primary Examiner*—Stephen Chin
*Assistant Examiner*—Ted M. Wang
(74) *Attorney, Agent, or Firm*—Philip Wadsworth; Sandra L. Godsey; Kent D. Baker

(57) ABSTRACT

A weighted mean arrival time determines a delay offset of a fractionally spaced equalizer. The weighted mean arrival time is determined using path arrival times and energies from a Rake receiver. The difference between a weighted mean arrival time and a current delay offset is set to a difference X, in units of the equalizer tap spacing. If the difference X is greater than or equal to 1 or less than or equal to −1, then the current delay offset is updated by an incremental delay offset and the equalizer filter coefficients are shifted by a number of tap spacings. Otherwise, the current delay offset is not updated and the filter coefficients of the fractionally spaced equalizer are not shifted. Adaptation of the filter coefficients and updates of the delay offset of the equalizer occur only during pilot bursts so as to minimize adaptation transients.

27 Claims, 6 Drawing Sheets

METHOD AND APPARATUS FOR ADJUSTING DELAY IN SYSTEMS WITH TIME-BURST PILOT AND FRACTIONALLY SPACED EQUALIZERS

BACKGROUND

1. Field

The present invention relates generally to wireless communications systems and more specifically to equalizer timing recovery techniques in a wireless communications systems.

2. Background

In a wireless communications environment, reliable communication can be adversely affected by a number of channel impairments. Typical sources that degrade the received signal are noise, co-channel interference, intersymbol interference ("ISI") and multipath interference. Multipath interference is often a very disruptive type of distortion to reliable wireless communication in that it produces fading.

In a coherent communications system, such as code division multiple access ("CDMA"), a radio receiver, in general, should be in constant synchronization with the radio transmitter in order to maintain a constant connection with the transmitter. If the receiver loses synchronization, a loss of "lock" with the transmitter occurs. This situation often leads to a loss of service for the user of the wireless service.

In a cellular phone environment, this can lead to dropped calls for the phone user or, in wireless data environment, to a slow, unreliable network connection for the user. Poor reliability can lead to aggravated users, who may seek to discontinue service with a provider if the situation persists. If poor reliability occurs often enough, a wireless service provider may lose market share and profit.

To combat the ill effects that a channel may cause, a well designed receiver may use a Rake processor, a fractionally spaced equalizer, or both. A Rake processor comprises one or more "fingers," each of which tracks an individual multipath ray so that the multipath rays from each finger can be added together constructively. Rake receivers are known in the art to perform well in low carrier-to-interference ("C/I") environments.

A fractionally spaced equalizer ("FSE") is a finite-length tapped delay line filter whose coefficients are spaced with a time separation less than or equal to the reciprocal bandwidth of the signal. If the reciprocal bandwidth is T seconds, then as an example, the FSE tapped delay line could be spaced at T/2 or 3T/4 seconds. The filter reduces the effects of ISI from multipath interference and pulse-filtering.

In order for a FSE to properly mitigate interference, the filter must span the channel's entire impulse response. The filter's delay offset must be adjusted to ensure that this indeed is the case. Additionally, since the channel's impulse response may change with time, the FSE's delay must be continuously changed so that it is always spanning the channel's impulse response.

Known methods for determining and adjusting the delay offset for a FSE, such as using timing information of the strongest Rake finger as delay offset for the equalizer, have been found to be unreliable. There is, therefore, a need in the art for an effective method for determining and adjusting the delay offset for a fractionally spaced equalizer.

SUMMARY

Embodiments disclosed herein address the above stated needs by providing an effective method for determining the delay offset for a fractionally spaced equalizer.

The presently disclosed embodiments are directed to method and apparatus for determining a delay offset in a fractionally spaced equalizer. According to one aspect of the present invention, a weighted mean arrival time is used to determine a delay offset of a fractionally spaced equalizer. The weighted mean arrival time is determined by using arrival times and signal energies from a first and second Rake receiver. Let X denote the difference between the weighted mean arrival time and the current delay offset in units of the equalizer's tap spacing. Let $Q(z)$ denote the greatest integer not exceeding z. If $Q(|X|)$, also referred to as an incremental delay offset, is greater than or equal to 1, then the current delay offset is updated. Also, a plurality of filter coefficients are shifted to an integer number of tap spacings, $Q(|X|)$. Otherwise, if $Q(|X|)$ is 0, then the current delay offset is not updated and the plurality of filter coefficients of the linear equalizer are not shifted. Adaptation of the plurality of filter coefficients of the linear equalizer occurs only during pilot bursts so as to minimize adaptation transients.

DETAILED DESCRIPTION

The presently disclosed embodiments are directed to method and apparatus for adjusting delay in a fractionally spaced equalizer. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. The word "exemplary" is used exclusively herein to mean "serving as an example, instance, or illustration." Any embodiment described herein as "exemplary"

is not necessarily to be construed as preferred or advantageous over other embodiments.

Figure 1:
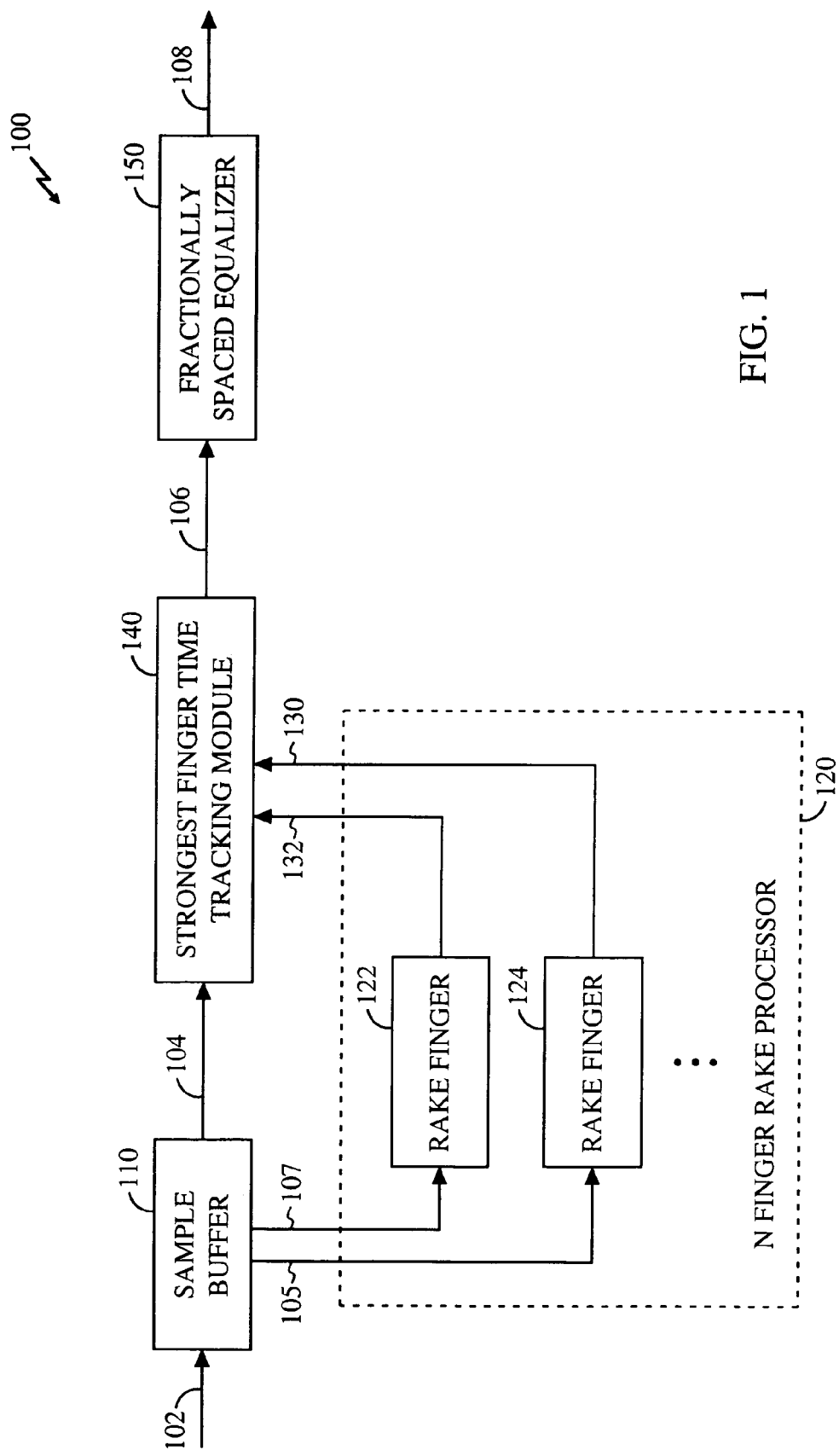
FIG. 1 is a block diagram of a communications receiver using the arrival time of the strongest Rake finger to provide a delay offset to the fractionally spaced equalizer.

Now referring to FIG. 1, block 100 illustrates a portion of the baseband processing of a communications receiver. Although block 100 only represents a portion of a baseband receiver, for brevity, it will be referred to as baseband receiver 100 in the present application. Baseband receiver 100 comprises sample buffer 110 which receives sample buffer input 102 arriving from a radio frequency ("RF") front-end not shown in FIG. 1. N finger Rake processor 120, also referred to simply as Rake processor 120, comprises a number of Rake fingers such as Rake finger 122 and Rake finger 124. Rake finger 122 receives Rake finger input 107 from sample buffer 110. Likewise, Rake finger 124 receives Rake finger input 105 from sample buffer 110. Sample buffer output 104 is provided to "strongest finger time tracking module" 140 which also receives Rake finger arrival time and signal energy 132 and Rake finger arrival time and signal energy 130 from Rake fingers 122 and 124, respectively. Strongest finger time tracking module output 106 is provided to fractionally spaced equalizer 150. Fractionally spaced equalizer output 108 is provided for further baseband processing. Rake processor 120 and fractionally spaced equalizer 150 are utilized for mitigating multipath interference and ISI.

Baseband receiver 100 shown may be located at an access terminal in a High Data Rate ("HDR") CDMA system such as a wireless modem, but may alternatively be a part of a base station transceiver, a satellite transponder, or a wireless mobile unit, such as cellular phone.

The general principles of CDMA communication systems, and in particular, the general principles for generation of spread spectrum signal for transmission over a communication channel is described in U.S. Pat. No. 4,901,307, entitled "Spread Spectrum Multiple Access Communication System Using Satellite or Terrestrial Repeaters," and assigned to the assignee of the present invention. The disclosure in that patent, i.e. U.S. Pat. No. 4,901,307, is hereby fully incorporated by reference into the present application. Moreover, U.S. Pat. No. 5,103,459, entitled "System and Method for Generating Signal Waveforms in a CDMA Cellular Telephone System", and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in a "high data rate" communication systems, disclosed in U.S. patent application entitled "Method and Apparatus for High Rate Packet Data Transmission", Ser. No. 08/963,386 filed on Nov. 3, 1997, now U.S. Pat. No. 6,574,211, issued Jun. 3, 2003, and assigned to the assignee of the present invention. The disclosure in that patent application is also hereby fully incorporated by reference into the present application.

Returning to the high level overview of baseband receiver 100, sample buffer input 102 to sample buffer 110 consists of received complex baseband samples, which, in general, arrive from the RF front-end, not shown in FIG. 1. Sample buffer input 102 can be over sampled (i.e., sampled at a rate greater than the Nyquist rate of the signal), and the samples would be passed to sample buffer 110, where they are temporarily stored for later processing. The over sampling process is commonly used in receiver designs and is known in the art.

Samples, in general, arrive at regular intervals so that sample buffer 110 is continually adding new samples and dropping old samples during normal receiver operation. Sample buffer 110 can be implemented as a first-in first-out ("FIFO") buffer.

Rake processor 120 accepts samples from sample buffer 110 with various arrival times for each one of Rake fingers 122 and 124. Rake finger 122 provides Rake finger arrival time and signal energy 132 to strongest finger time tracking module 140. Similarly, Rake finger 124 also provides Rake finger arrival time and signal energy 130 to strongest finger time tracking module 140. Strongest finger time tracking module 140 is coupled to sample buffer 110 by way of sample buffer output 104. Strongest finger time tracking module 140 provides delayed baseband samples to fractionally spaced equalizer 150, which then provides fractionally spaced equalizer output 108 for further baseband processing.

In general, baseband receiver 100 can assign each one of Rake fingers 122 and 124 to track sample buffer input 102 with different assigned arrival times. The assigned arrival times for Rake fingers 122 and 124 are determined by a searcher, which is not shown in FIG. 1. Rake finger 122 may determine the signal energy strength by correlating sample buffer input 102 with a local PN generator that has been delayed by the assigned arrival time. Rake finger 124 performs the same processing as Rake finger 122 with a different arrival time. Local PN generators are part of a baseband processor, but are not shown in FIG. 1.

Rake finger arrival times and signal energies 130 and 132 are provided as input to strongest finger time tracking module 140. Strongest finger time tracking module 140 selects the arrival time of the "strongest Rake finger" to determine the delay offset for fractionally spaced equalizer 150, where the "strongest Rake finger" refers to the Rake finger that has the largest amount of signal energy. Strongest finger time tracking module 140 selects samples from sample buffer 110 with a delay offset equal to the strongest Rake finger arrival time as input to fractionally spaced equalizer 150.

Fractionally spaced equalizer 150 in baseband receiver 100 is a type of linear equalizer. Fractionally spaced equalizer 150 can be implemented as a finite impulse response ("FIR") filter. Fractionally spaced equalizer 150 filters the strongest finger time tracking module output 106, in general, at a rate faster than chip rate, which for some CDMA systems, such as IS-2000 and IS-95 standards, is 1.2288 MHz.

In FIG. 1, using the arrival time of the strongest Rake finger is a known method for establishing a delay offset for fractionally spaced equalizer 150. This method centers fractionally spaced equalizer 150 about the region of the channel response containing the most energy. As such, fractionally spaced equalizer 150 equalizes most of the channel response because pre-cursor and post-cursor ISI are usually in the vicinity of the strongest Rake finger. Thus, assuming a stationary channel response, fractionally spaced equalizer 150, in general, cancels most of the distorted portion of the signal.

In practice, using the arrival time of strongest Rake finger as a delay offset to fractionally spaced equalizer 150 has several drawbacks. In general, the arrival time of the strongest Rake finger, either Rake finger 122 or Rake finger 124, is not stationary, but rather it is constantly changing because the time tracking loop of strongest finger time tracking module 140 is continually making timing adjustments and because of changes in the position of the receiver or slow changes in the environment. Fractionally spaced equalizer 150 effectively perceives timing adjustments made by strongest finger time tracking module 140 as timing jitter.

Timing jitter can be very problematic for the adaptive algorithms that fractionally spaced equalizer 150 relies on. Fractionally spaced equalizer 150 may use the well known LMS ("Least Mean Square") algorithm, from the class of stochastic gradient descent adaptive algorithms, to adapt the filter coefficients to their Minimum Mean Square Solution ("MMSE") solution. The MMSE filter coefficients maximize the Signal-to-Interference-and-Noise Ratio ("SINR") at the FSE output. The LMS algorithm is a desirable choice to use in adapting the fractionally spaced equalizer 150 for several reasons. A first reason is that the LMS algorithm can be easily implemented. A second reason is that the LMS algorithm is generally low in complexity relative to other adaptive algorithms. Although the LMS algorithm is generally stable, it often adapts slowly with respect to the time tracking loop adjustments made by strongest finger time tracking module 140.

In baseband receiver 100, if a time tracking loop adjustment occurs, fractionally spaced equalizer 150 will need to adapt to the timing adjustment. If the time tracking loop adjustment is made often enough, then fractionally spaced equalizer 150 may be constantly adapting to these changes and the filter coefficients may never converge to near their MMSE solution. As a result, fractionally spaced equalizer 150 could probably not adapt adequately and detection performance could be sub-optimal. Consequently, the overall system performance may become unacceptable.

One method to lessen the occurrence of timing adjustments is to make the loop time constant of strongest finger time tracking module 140 larger. The loop time constant would have to be made large enough such that the timing adjustment made by the strongest finger time tracking module 140 is slow enough for the adaptive algorithm of fractionally spaced equalizer 150 to adapt to. However, this approach can present a problem, because the tracking performance of the strongest finger is degraded. If either Rake finger 122 or 124 is unable to track quickly enough, then Rake finger 122 or 124 could lose lock, respectively.

Figure 2:
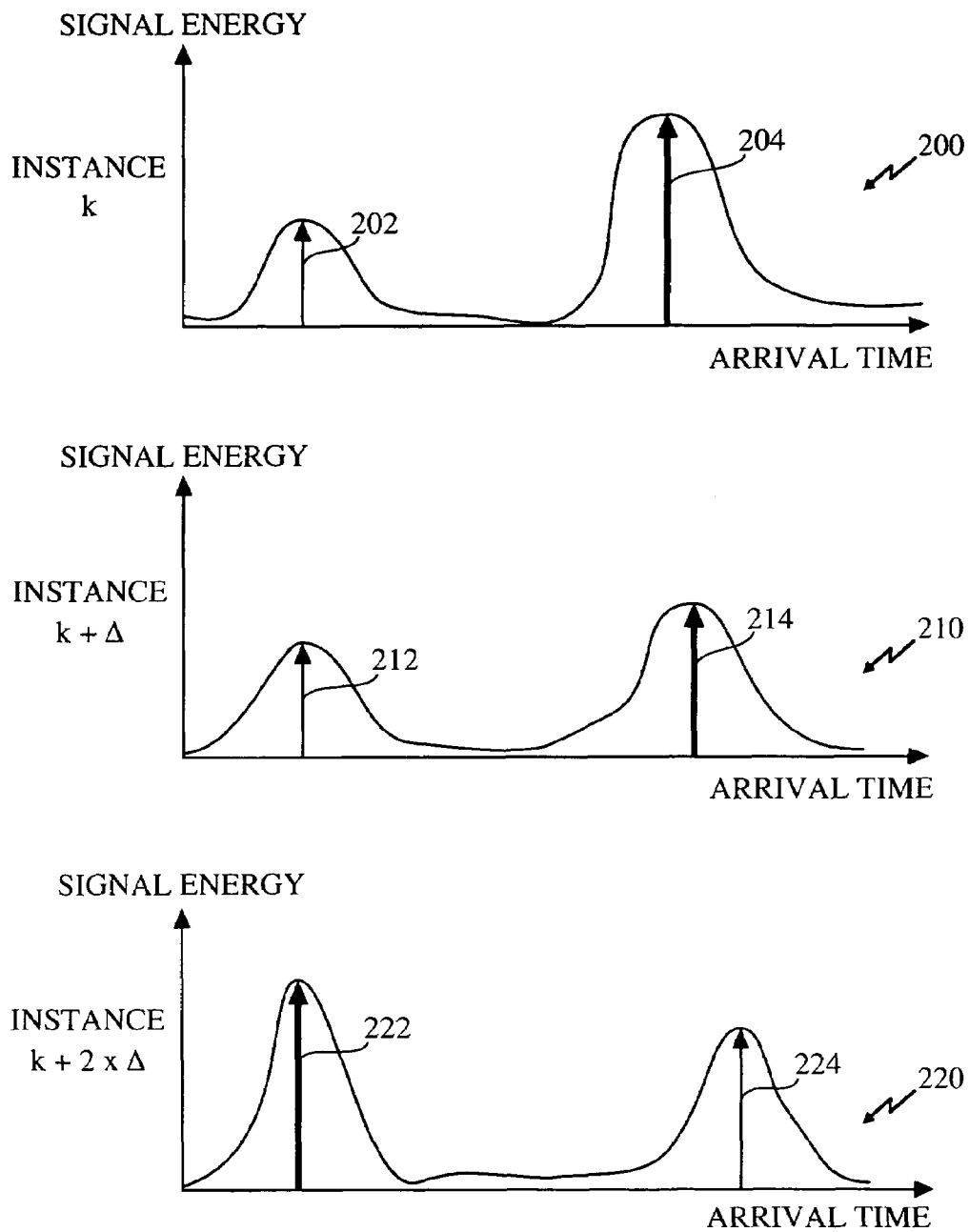
FIG. 2 shows time elapsed snapshots of a channel's impulse response showing how the strongest peak changes over time.

FIG. 2 illustrates another problem with using the arrival time of strongest Rake finger as the delay offset of fractionally spaced equalizer 150. Plots 200, 210, and 220 represent a time elapsed snap shot of the time-domain channel response at intervals of some small time interval Δ in the order of 1 or 2 slots.

Plot 200 illustrates the channel response at instance k. Peaks 202 and 204 correspond to two multipath components found in the channel response. In baseband receiver 100, Rake finger 124 is assigned to peak 202 and Rake finger 122 is assigned to peak 204. Initially, peak 204 is the larger of the two peaks and the arrival time of peak 204 is used as the delay offset for fractionally spaced equalizer 150 by operation of strongest finger time tracking module 140.

In the next instance shown in plot 210, the receiver has moved away from the multipath signal represented by peak 214 and the finger time tracking loop will constantly adjust its timing in order to maintain lock. Peak 214 is shown to have decreased in signal strength while peak 212 has grown in strength.

In the next instance, plot 220, peak 224 has diminished in strength and peak 222 is now the strongest peak. Consequently, strongest finger time tracking module 140 will select Rake finger 124 as the strongest Rake finger. Peak 222 can be at a delay of several chips away from peak 224. Thus, the delay offset of fractionally spaced equalizer 150 will have changed by several chips. The MMSE filter coefficients for fractionally spaced equalizer 150 with a delay offset equal to the arrival time for peak 222 will be very different from the MMSE filter coefficients for fractionally spaced equalizer 150 with a delay offset equal to the arrival time of peak 224. In an HDR CDMA system, it can take several slots for the equalizer to adapt to what it effectively perceives as a drastic change in the channel characteristics. The symbol error rate can increase significantly if the filter's coefficients are far from their MMSE settings for several frames.

Figure 3:
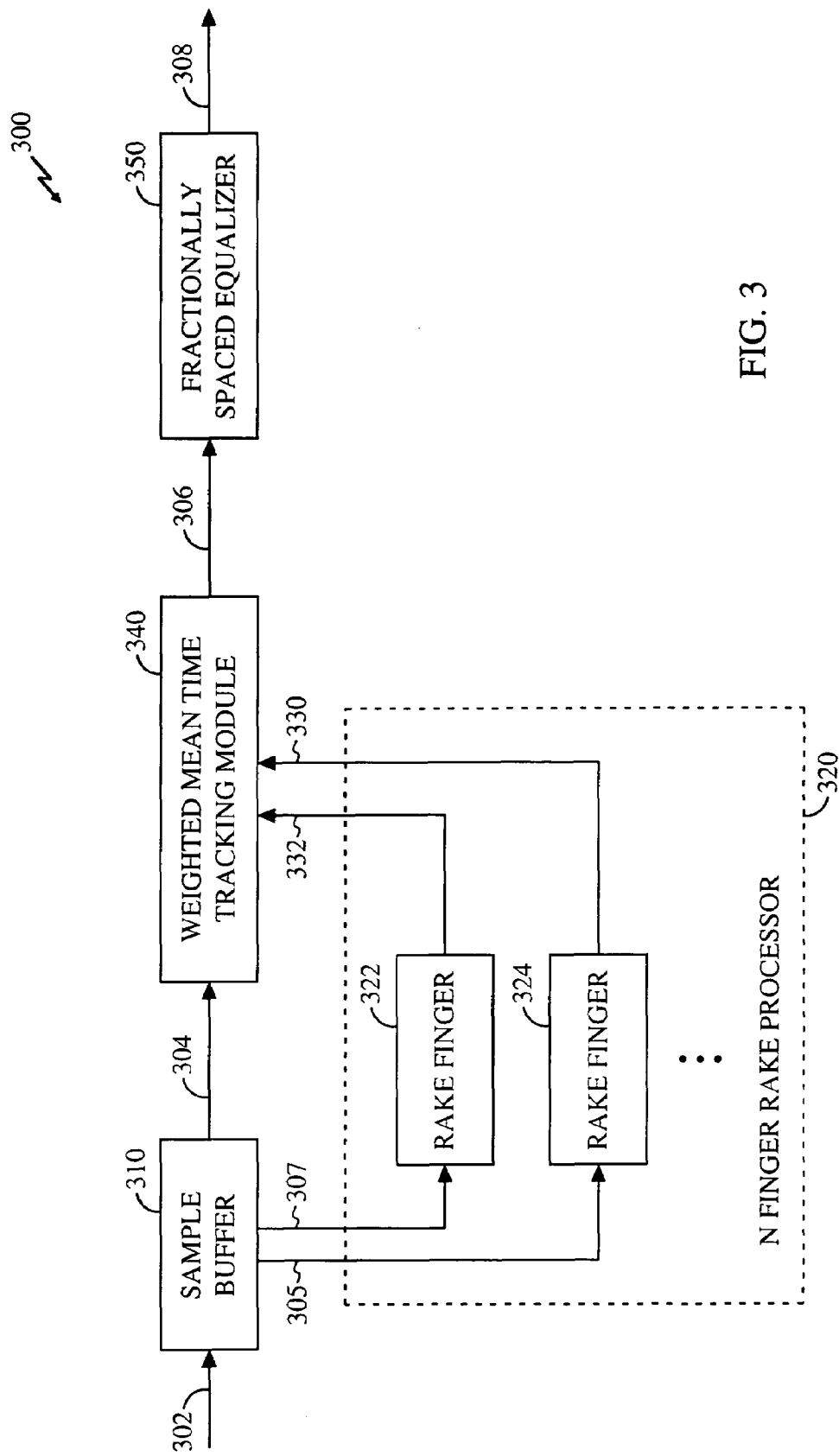
FIG. 3 is a block diagram of a communications receiver using the weighted mean arrival time of the Rake fingers as a delay offset for the fractionally spaced equalizer.

Now referring to FIG. 3, block 300 illustrates a portion of the baseband processing of a communications receiver. Although block 300 only represents a portion of a baseband receiver, for brevity, it will be referred to as baseband receiver 300 within this patent application. Baseband receiver 300 comprises sample buffer 310 which receives sample buffer input 302 arriving from an RF front-end not shown in FIG. 3. N finger Rake processor 320, also referred to simply as Rake processor 320, comprises a number of Rake fingers such as Rake finger 322 and Rake finger 324. Rake finger 322 receives Rake finger input 307 from sample buffer 310. Likewise, Rake finger 324 receives Rake finger input 305 from sample buffer 310. Sample buffer output 304 is provided to "weighted mean time tracking module" 340 which also receives Rake finger arrival time and signal energy 332 and Rake finger arrival time and signal energy 330 from Rake fingers 322 and 324, respectively. Weighted mean time tracking module output 306 is provided to fractionally spaced equalizer 350. Fractionally spaced equalizer output 308 is provided for further baseband processing.

Baseband receiver 300 illustrates a portion of the baseband processing of a wireless communications receiver that comprises Rake processor 320 and fractionally spaced equalizer 350 for mitigating multipath interference and ISI. Sample buffer input 302 to baseband receiver 300 consists of received complex baseband samples, which, in general, arrive from the RF front-end, not shown in FIG. 3. Sample buffer input 302 can be over sampled and the samples would be passed to sample buffer 310, where they are temporarily stored for later processing. Samples, in general, arrive at regular intervals and so sample buffer 310 is continually adding new samples and dropping old samples during normal receiver operation. Sample buffer 310 can be implemented as a FIFO buffer.

Rake processor 320 accepts samples from sample buffer 310 with various arrival times for each Rake finger 322 and 324. Rake finger 322 provides Rake finger arrival time and signal energy 332 to weighted mean time tracking module 340. Similarly, Rake finger 324 also provides Rake finger arrival time and signal energy 330 to weighted mean time tracking module 340. Weighted mean time tracking module 340 is coupled to sample buffer 310 by way of sample buffer output 304.

Weighted mean time tracking module 340 provides delayed baseband samples to fractionally spaced equalizer 350 by way of weighted mean time tracking module output 306. Weighted mean time tracking module 340 selects samples from sample buffer 310 with a delay offset equal to the "weighted mean arrival time" as input to fractionally spaced equalizer 350, which then provides fractionally spaced equalizer output 308 to remainder of baseband processing. The determination of the "weighted mean arrival time" is discussed in a later section of the present application.

Figure 4:
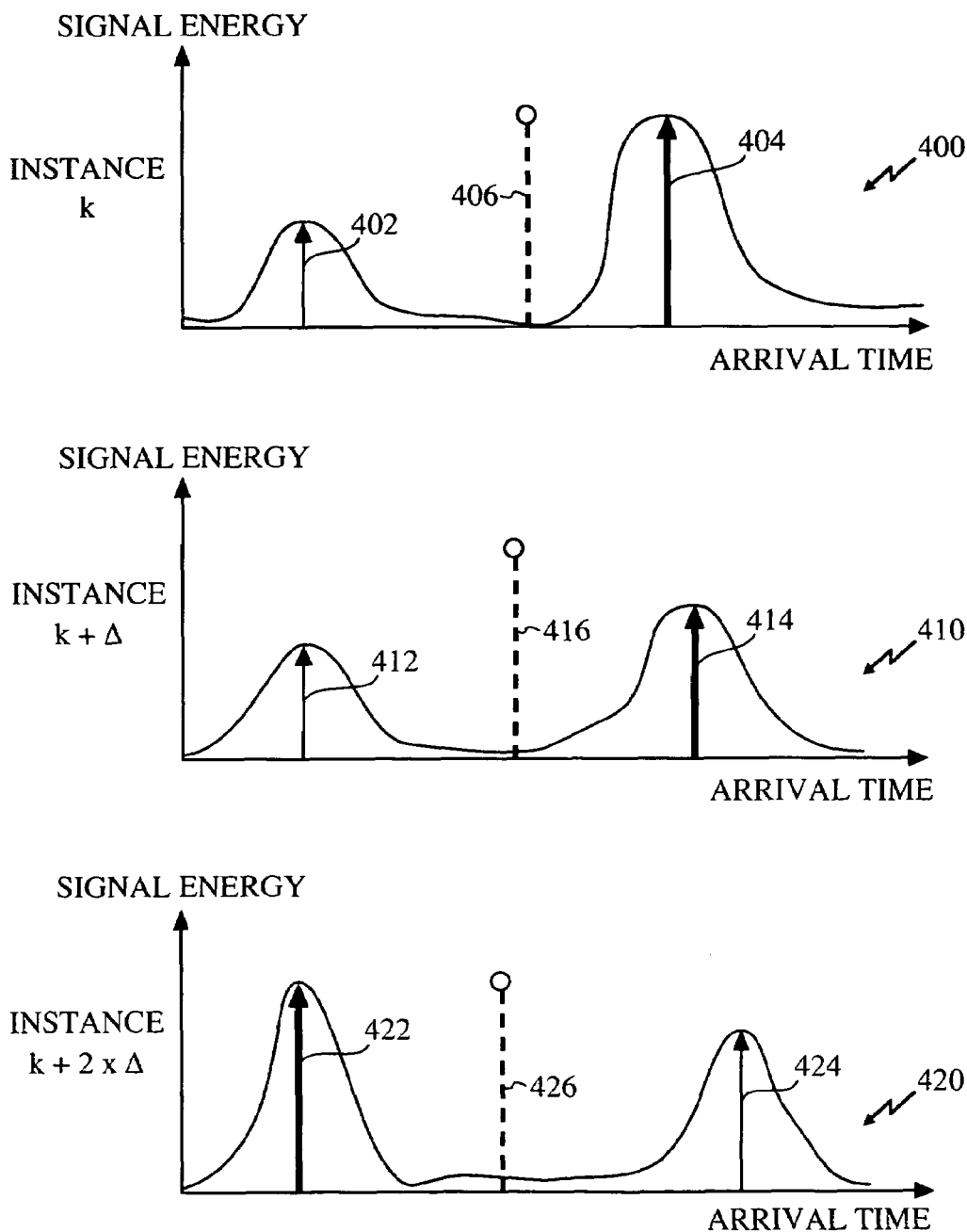
FIG. 4 shows time elapsed snapshots of a channel's impulse response showing how the weighted mean arrival time changes over time.

FIG. 4 illustrates some of the advantages of using the weighted mean arrival time as the delay offset for fractionally spaced equalizer 350. Plots 400, 410, and 420 show the changes in the weighted mean arrival time over a period of time. Plots 400, 410, and 420 represent a time elapsed snap shot of the time-domain channel response at intervals of some small time interval Δ in the order of 1 or 2 slots. Furthermore, plots 400, 410, and 420 represent the same time elapsed snapshots shown in FIG. 2.

Plot 400 illustrates the channel response at instance k. Peaks 402 and 404 correspond to two multipath components found in the channel response. In baseband receiver 300, Rake finger 324 is assigned to peak 402 and Rake finger 322 is assigned to peak 404. Initially, peak 404 is the larger than peak 402. The weighted mean arrival time 406 of peaks 402 and 404 is represented by dashed line nearly midway between peaks 402 and 404. Weighted mean arrival time 406 is used as the offset delay for fractionally spaced equalizer 350 as per operation of weighted mean time tracking module 340.

In the next instance, shown in plot 410, the channel response changes exactly as it changed in plot 210. It is seen here that the weighted mean arrival time 416 has changed slightly since peak 414 has less energy than in the previous instance, and peak 412 has more energy than in the previous instance, but incrementally more.

In the last time instance, plot 420, peak 422 is the dominant peak and peak 424 is no longer the strongest Rake finger. The weighted mean arrival time 426 has changed from its previous position 416, but not as drastically as a delay offset based on the strongest Rake finger, which changed from peak 414 to peak 422.

One embodiment may use the weighted mean arrival time derived from Rake fingers 322 and 324 as the delay offset for fractionally spaced equalizer 350 rather than the delay offset of the strongest Rake finger. The weighted mean arrival time of Rake fingers is determined by the following steps:

1) using the arrival time of Rake finger i, determine the normalized signal energy strength, $f_i(n)$, of the Rake finger with respect to the total signal energy strength of all Rake fingers, where "n" designates the slot number discussed in more detail below. Assuming there are M active Rake fingers in Rake processor 320, the normalized signal energy strength for Rake finger i is determined as:

$$f_i(n) = \frac{s_i(n)}{\sum_{i=1}^{M} s_i(n)},$$

where $s_i(n)$ is the energy of the i-th RAKE finger;

2) multiplying the normalized signal energy of Rake finger i, $f_i(n)$ by the arrival time of Rake finger i. The product is the weighted arrival time of Rake finger i;

3) repeating step 1 and 2 above for each Rake finger; and 4) summing the weighted arrival times of each Rake finger to form the weighted mean arrival time.

Summarizing the steps above, the weighted mean arrival time is determined as, $$\tau(n) = \sum_{i=1}^{M} f_i(n)\tau_i(n),$$

where $\tau_i$ is the arrival time of the ith Rake finger.

Using the weighted mean arrival time for the delay offset is one exemplary embodiment. An alternative embodiment can use statistical combination of Rake finger arrival time and energies other than weighted mean. For instance, another embodiment may use a median arrival time of the Rake fingers.

To determine the median arrival time, the arrival time of each Rake finger along with its energy is put in a list ordered according to arrival time. The median entry in the list is selected and that Rake finger's corresponding arrival time is selected as the median arrival time.

Another embodiment could use a simple mean rather than a weighted mean. To determine the simple mean, the arrival times of K Rake fingers are added together and divided by K, where K can range from 1 to the total number of available Rake fingers. K can be based on the number of active Rake fingers as well. Various forms of statistically derived arrival times can be used for updating the delay offset.

For baseband receiver 300, it is desirable to change the delay offset of fractionally spaced equalizer 350 only if the statistically derived arrival time, such as weighted mean arrival time, changes by more than a tap-spacing. This is because an infinite-length FSE can correct for any timing error by synthesizing the appropriate delay through its MMSE coefficient settings. This roughly holds true for a finite-length FSE as long as the equalizer is broadly centered around the channel's impulse response. This can be implemented conveniently in any communications system that has slotted data frames at the physical layer. One example of such a system is the HDR CDMA system.

Figure 5:
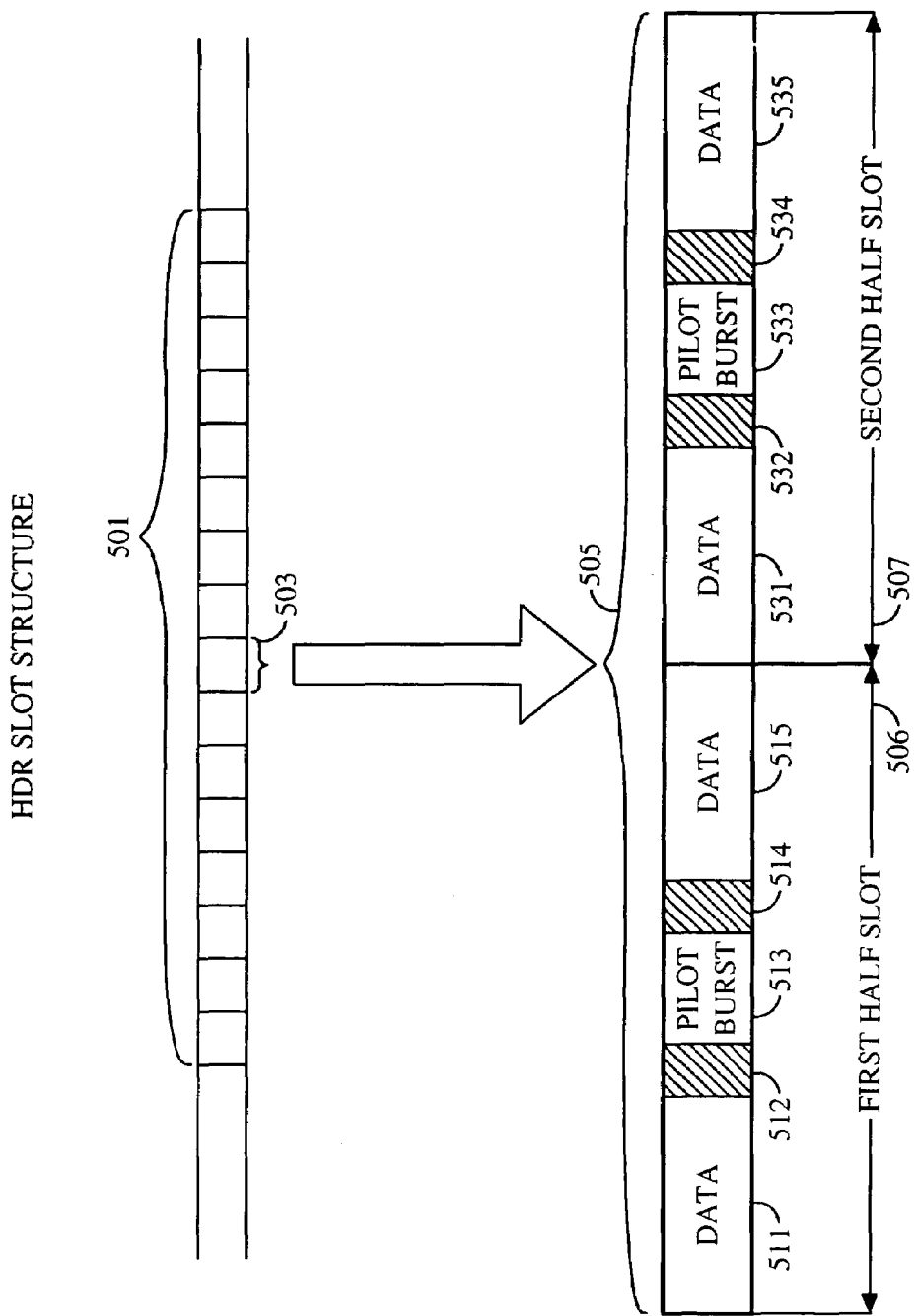
FIG. 5 is an HDR slot structure in the forward link.

FIG. 5 shows the HDR slot structure in the forward link. HDR frame 501 in the forward link is aligned with the PN sequence rollover. The PN sequence repeats every 26.67 ms and is 32768 chips long. Within HDR frame 501 there are sixteen HDR slots, each of length 2048 chips or 1.67 ms. HDR slot 503 is shown in an expanded view as HDR slot 505, which contains HDR half slots 506 and 507. Each HDR half slot contains a pilot burst. Pilot burst 513 is for HDR half slot 506 and pilot burst 533 is for HDR half slot 507. Pilot bursts 513 and 533 are each 96 chips long and are punctured into the middle of their respective HDR half slot.

HDR half slots 506 and 507 contain control channel information at 512, 514, 532, and 534. HDR half slot 506 contains data symbols at 511 and 515. Likewise, HDR half slot 507 contains data symbols at 531 and 535. According to one embodiment, fractionally spaced equalizer 350 is adapted during a pilot burst, such as pilot bursts 513 and 533. The sequence of symbols of pilot bursts 513 and 533 is known to the receiver. As such, pilot bursts 513 and 533 can be used as training sequences for training fractionally spaced equalizer 350.

According to one embodiment, for more accurate adaptation of fractionally spaced equalizer 350, it is desirable to limit the number of updates to the delay offset of fractionally spaced equalizer 350. To minimize the number of updates to the delay offset of fractionally spaced equalizer 350 in a slotted system, the delay offset updates occur:

1) at most once per slot; and
2) only when the statistically derived arrival time and the current delay offset of fractionally spaced equalizer 350 differ by more than one tap spacing of fractionally spaced equalizer 350.

Furthermore, the delay offset of fractionally spaced equalizer 350 is updated only at the start of pilot bursts 513 and 533. The adaptation algorithm can use the ensuing pilot burst to drive the equalizer filter coefficients to near the MMSE solution corresponding to the updated delay offset, before these filter coefficients are used to demodulate control or data symbols. If the delay offset updates were to occur at any other time during the HDR slot, then the filter coefficients that are applied to demodulating the control or data portions of the HDR slot will differ significantly from their optimal MMSE solution; receiver performance will suffer greatly as a result. In one embodiment, if baseband receiver 300 is processing an HDR slot, then fractionally spaced equalizer 350 has a delay offset referred to as current delay offset. Next, the weighted mean arrival time is determined by weighted mean time tracking module 340 using the above method for determining the weighted mean arrival time. Next, a value X is set to the weighted mean arrival time minus the current delay offset of fractionally spaced equalizer 350. X has units of the equalizer tap spacing. If X is greater than or equal to 1 or less than or equal to −1, then three tasks are performed.

Let Q(z) denote the greatest integer not exceeding z. The first task is to increment the current delay offset of fractionally spaced equalizer 350 by Q(|X|), if X is greater than or equal to 1, or to decrement the current delay offset of fractionally spaced equalizer 350 by Q(|X|), if X is less than or equal to −1. The second task is to time shift the filter coefficients of fractionally spaced equalizer by Q(|X|) taps, which can be a time advance or time delay of fractionally spaced equalizer 350 depending on the sign of X. The third task is that the first Q(|X|) coefficients of fractionally spaced equalizer 350 are set to zero if the current delay offset was incremented, or the last Q(|X|) coefficients of fractionally spaced equalizer 350 are set to zero if the current delay offset was decremented.

Otherwise, if Q(|X|) equals zero, then no update occurs and the process is repeated at the next HDR slot.

Figure 6:
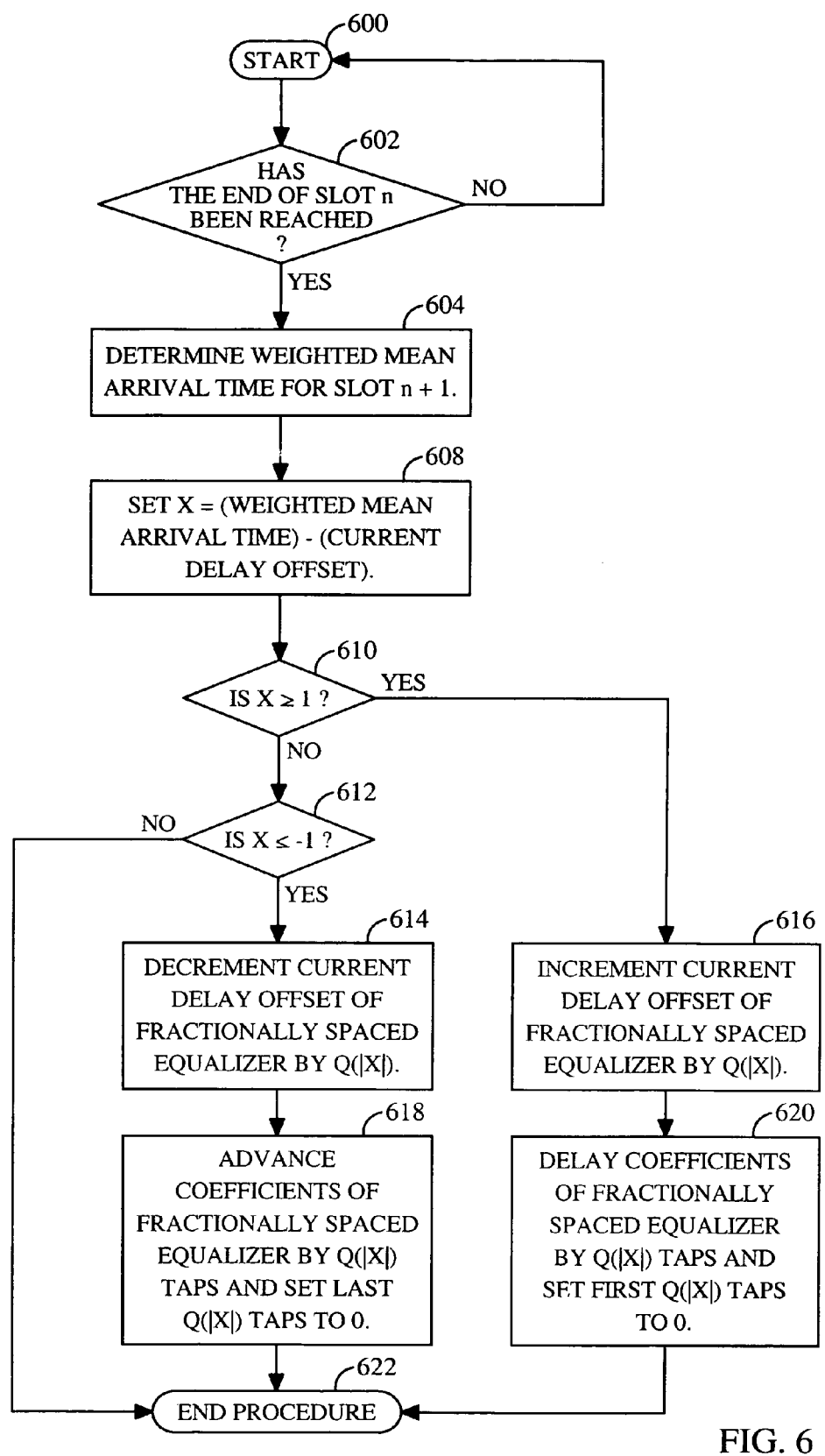
FIG. 6 is a flowchart showing the filter coefficient update procedure.

One embodiment for adjusting the delay offset of fractionally spaced equalizer 350 is shown in the flowchart of FIG. 6. The procedure starts at step 600. In step 602, weighted mean time tracking module 340 waits in a loop and is continually polled until the end of slot n is reached.

In step 604, weighted mean time tracking module 340 determines the weighted mean arrival time for slot n+1. Rake fingers 322 and 324, provide their respective arrival times and signal energies to weighted mean time tracking module 340. Weighted mean time tracking module 340 then determines the weighted mean arrival time.

In step 608, weighted mean time tracking module 340 determines the difference between the weighted mean arrival time for slot n+1 and the current delay offset of fractionally spaced equalizer 350 in units of the tap spacing. Weighted mean time tracking module 340 then sets the above difference to X.

In step 610, weighted mean time tracking module 340 determines if the difference X is greater than or equal to 1. If the difference is greater or equal to 1, then weighted mean time tracking module 340 proceeds to step 616. If the difference is less than 1, weighted mean time tracking module 340 proceeds to step 612.

In step 612, weighted mean time tracking module 340 determines if the difference X is less than or equal to −1. If the difference is less than or equal to −1, then weighted mean time tracking module 340 proceeds to step 614. If the difference is greater than −1, weighted mean time tracking module 340 proceeds to step 622.

In step 614, weighted mean time tracking module 340 decrements the current delay offset of fractionally spaced equalizer 350 by Q(|X|), where X was determined in step 608 and Q(z) is defined as the greatest integer not exceeding z. Weighted mean time tracking module 340 then proceeds to step 618.

In step 616, weighted mean time tracking module 340 increments the current delay offset of fractionally spaced equalizer 350 by Q(|X|), where X was determined in step 608 and Q(z) is defined as the greatest integer not exceeding z. Weighted mean time tracking module 340 then proceeds to step 620.

In step 618, the coefficients of fractionally spaced equalizer 350 are advanced by Q(|X|) taps. Let h(k,n) denote the k-th filter coefficient at slot n, where k ranges from 0 to N−1. Then, h(k,n+1) is formed from h(k,n) as follows: for k=0 to N−1−Q(|X|), h(k,n+1) is set equal to h(k+Q(|X|),n); for k=N−Q(|X|) to N−1, h(k,n+1) is set equal to zero. The filter coefficients after the update are h(k,n+1) and the weighted mean time tracking module 340 proceeds to the end of the procedure at step 622.

In step 620, the coefficients of fractionally spaced equalizer 350 are time delayed by Q(|X|) taps. Let h(k,n) denote the k-th filter coefficient at slot n. Then, h(k,n+1) is formed from h(k,n) as follows: for k=Q(|X|) to N−1, h(k,n+1) is set equal to h(k−Q(|X|),n); for k=0 to Q(|X|)−1, h(k,n+1) is set equal to zero. The filter coefficients after the update are h(k,n+1) and the weighted mean time tracking module 340 proceeds to the end of the procedure at step 622. Thus, in the manner described above, the invention provides method and apparatus for determining a delay offset in a fractionally spaced equalizer.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile unit, base station transceiver, or satellite transponder. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Thus, method and apparatus for determining a delay offset in a fractionally spaced equalizer have been described.

What is claimed is:

1. A method for determining a current delay offset of a fractionally spaced equalizer, said method comprising steps of:
    determining an arrival time from a first and a second Rake receiver fingers;
    determining a difference between said arrival time and a previous delay offset of said fractionally spaced equalizer; and
    modifying said current delay offset of said fractionally spaced equalizer by an incremental delay offset when said difference is greater than or equal to one tap spacing.

2. The method of claim 1, wherein said arrival time is statistically derived.

3. The method of claim 2 wherein said statistically derived arrival time is a weighted mean arrival time.

4. The method of claim 3 further comprising steps of:
    collecting a first arrival time and a first signal energy from said first Rake receiver finger;
    collecting a second arrival time and a second signal energy from said second Rake receiver finger;
    weighting said first arrival time by said first signal energy to determine a first weighted arrival time;
    weighting said second arrival time by said second signal energy to determine a second weighted arrival time; and
    utilizing said first arrival time and said second arrival time to determine said weighted mean arrival time.

5. The method of claim 2 wherein said statistically derived arrival time is a median arrival time.

6. The method of claim 2 wherein said statistically derived arrival time is a simple mean arrival time.

7. The method of claim 4 further comprising a step of utilizing a total energy of said first and second signal energies to normalize said first signal energy.

8. The method of claim 1 wherein said first Rake receiver finger receives data from a sample buffer.

9. The method of claim 1 wherein said second Rake receiver finger receives data from a sample buffer.

10. The method of claim 1 wherein said incremental delay offset is determined by selecting a highest integer less than an absolute value of said difference.

11. The method of claim 1 further comprising a step of shifting a plurality of filter coefficients by a multiple of said one tap spacing.

12. The method of claim 1 wherein said modifying step occurs when an absolute value of said difference is greater than one.

13. The method of claim 1 wherein said modifying step occurs during a pilot burst.

14. The method of claim 1 wherein said fractionally spaced equalizer is a finite impulse response filter.

15. The method of claim 1 wherein input to said fractionally spaced equalizer is delayed by said current delay offset.

16. A receiver in a wireless communications system, said receiver comprising:
    a sample buffer coupled to a first and a second Rake receiver fingers; and
    a weighted mean time tracking module coupled to said first and said second Rake receiver fingers and said sample buffer, and wherein said weighted mean time tracking module is configured to set a current delay offset of a fractionally spaced equalizer in said receiver to a weighted mean arrival time.

17. The receiver of claim 16 wherein said weighted mean time tracking module is further configured to collect a first arrival time and a first signal energy from said first Rake receiver finger and to collect a second arrival time and a second signal energy from said second Rake receiver finger.

18. The receiver of claim 17 wherein said weighted mean time tracking module is further configured to weight said first arrival time by said first signal energy to determine a first weighted arrival time and to weight said second arrival time by said second signal energy to determine a second weighted arrival time.

19. The receiver of claim 18 wherein said weighted mean time tracking module is further configured to determine said weighted mean arrival time from said first and said second weighted arrival time.

20. The receiver of claim 17 wherein said weighted mean time tracking module determines a total energy of said first and second signal energies to normalize said first signal energy.

21. The receiver of claim 17 wherein said weighted mean time tracking module determines a total energy of said first and second signal energies to normalize said second signal energy.

22. The receiver of claim 16 wherein said weighted mean time tracking module increments said current delay offset by an incremental delay offset when said weighted mean arrival time differs from a previous delay offset by a value greater than or equal to one tap spacing.

23. The receiver of claim 16 wherein said weighted mean time tracking module decrements said current delay offset by an incremental delay offset when said weighted mean arrival time differs from a previous delay offset by a value less than or equal to negative one tap spacing.

24. The receiver of claim 16 wherein a plurality of filter coefficients of said fractionally spaced equalizer are shifted during a pilot burst.

25. The receiver of claim 16 wherein said fractionally spaced equalizer is a finite impulse response filter.

26. A digital signal processing apparatus to determine a current delay offset of a fractionally spaced equalizer, said processing apparatus comprising:
   a storage; and
   a digital signal processor coupled to said storage and used to interpret digital signals by:
      determining a statistically derived arrival time from a first and a second Rake receiver finger;
      determining a difference between said statistically derived arrival time and a previous delay offset of said fractionally spaced equalizer; and
      modifying said current delay offset of said fractionally spaced equalizer by an incremental delay offset when said difference is greater than or equal to one tap spacing.

27. A receiver in a wireless communications system, said receiver comprising:
   a buffering means coupled to a first and a second Rake receiver means; and
   a weighted mean time tracking means coupled to said first and said second Rake receiver means and said buffer means, wherein said weighted mean time tracking means is configured to set a current delay offset of a fractionally spaced equalizer means in said receiver to a weighted mean arrival time.

* * * * *